(12) United States Patent
Ren

(10) Patent No.: US 11,249,613 B2
(45) Date of Patent: Feb. 15, 2022

(54) METHOD AND APPARATUS FOR DISPLAYING ORBITING ICONS CORRESPONDING TO PROGRAM APPLICATION FUNCTIONS

(71) Applicant: TENCENT TECHNOLOGY (SHENZHEN) COMPANY LIMITED, Shenzhen (CN)

(72) Inventor: Shimeng Ren, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 488 days.

(21) Appl. No.: 15/847,237

(22) Filed: Dec. 19, 2017

(65) Prior Publication Data

US 2018/0107363 A1 Apr. 19, 2018

Related U.S. Application Data

(63) Continuation of application No. PCT/CN2016/105336, filed on Nov. 10, 2016.

(30) Foreign Application Priority Data

Nov. 20, 2015 (CN) .......................... 201510810950.5

(51) Int. Cl.
*G06F 3/0482* (2013.01)
*G06F 3/0481* (2022.01)
(Continued)

(52) U.S. Cl.
CPC ........ *G06F 3/04817* (2013.01); *G06F 3/0482* (2013.01); *G06F 3/0486* (2013.01); *G06F 3/0488* (2013.01); *G06T 11/001* (2013.01)

(58) Field of Classification Search
CPC .. G06F 3/04817; G06F 3/0482; G06F 3/0486; G06F 3/0488; G06F 3/0484; G06T 11/001
See application file for complete search history.

(56) References Cited

U.S. PATENT DOCUMENTS 6,544,123 B1 * 4/2003 Tanaka .................... A63F 13/10
463/36
8,959,553 B1 * 2/2015 Pan .................... H04N 5/44543
725/45
(Continued)

FOREIGN PATENT DOCUMENTS

CN 101627349 A 1/2010
CN 101957711 A 1/2011
(Continued)

OTHER PUBLICATIONS

Screen captures from YouTube video clip entitled "Preview: TouchFLO 3D 2.5 (Manila 2.5)", 4 pages, uploaded on Jul. 7, 2009 by user "Pocketnow". Retrieved from Internet: <https://www.youtube.com/watch?v=l0gMBpDKgyU>. (Year: 2009).*
(Continued)

*Primary Examiner* — Jennifer N Welch
*Assistant Examiner* — K C Chen
(74) *Attorney, Agent, or Firm* — Anova Law Group, PLLC

(57) ABSTRACT

The present disclosure provides a method and an apparatus for displaying an icon. The method includes: displaying a first icon and at least one display orbit on an interface, the first icon being a user icon of a user that currently logs in to an application program, and each of the at least one display orbit being a path that uses the first icon as a center and surrounds a periphery of the first icon; obtaining a first application function activated in the application program; obtaining a first function icon of the first application func- (Continued)

tion; and displaying the first function icon of the first application function on a first display orbit, the first display orbit being one of the at least one display orbit.

17 Claims, 8 Drawing Sheets

(51) Int. Cl.
*G06F 3/0486* (2013.01)
*G06F 3/0488* (2022.01)
*G06T 11/00* (2006.01)

(56) References Cited

U.S. PATENT DOCUMENTS

| | | | |
|---|---|---|---|
| 9,946,427 B1* | 4/2018 | Murphy | G06F 9/451 |
| 2003/0197740 A1 | 10/2003 | Reponen | |
| 2004/0001105 A1 | 1/2004 | Chew et al. | |
| 2004/0100479 A1* | 5/2004 | Nakano | G06F 1/1626 |
| | | | 715/700 |
| 2005/0073521 A1* | 4/2005 | Watanabe | H04L 29/06 |
| | | | 345/440 |
| 2005/0138564 A1 | 6/2005 | Fogg | |
| 2006/0212829 A1* | 9/2006 | Yahiro | G06F 3/0482 |
| | | | 715/810 |
| 2006/0212830 A1* | 9/2006 | Fogg | G06Q 10/107 |
| | | | 715/835 |
| 2006/0217199 A1* | 9/2006 | Adcox | G07F 17/3223 |
| | | | 463/40 |
| 2007/0247643 A1 | 10/2007 | Nakamura et al. | |
| 2008/0222569 A1* | 9/2008 | Champion | G06F 3/0482 |
| | | | 715/834 |
| 2010/0146437 A1* | 6/2010 | Woodcock | G06Q 30/06 |
| | | | 715/806 |
| 2010/0161541 A1* | 6/2010 | Covannon | G06F 16/444 |
| | | | 706/47 |
| 2011/0289459 A1* | 11/2011 | Athans | G06F 3/0481 |
| | | | 715/854 |
| 2012/0150970 A1* | 6/2012 | Peterson | G06F 3/04817 |
| | | | 709/206 |
| 2012/0226978 A1* | 9/2012 | Harberts | G06F 3/0482 |
| | | | 715/702 |
| 2013/0067375 A1* | 3/2013 | Kim | G05F 1/66 |
| | | | 715/769 |
| 2013/0111406 A1* | 5/2013 | Gebhart | G06F 3/0482 |
| | | | 715/823 |
| 2014/0011592 A1* | 1/2014 | Kim | A63F 13/12 |
| | | | 463/40 |
| 2014/0123183 A1* | 5/2014 | Fujimoto | H04N 5/4403 |
| | | | 725/37 |
| 2014/0189523 A1* | 7/2014 | Shuttleworth | G06F 3/04817 |
| | | | 715/741 |
| 2015/0093736 A1* | 4/2015 | Kadar | G09B 5/02 |
| | | | 434/353 |
| 2015/0294433 A1* | 10/2015 | Ye | G06T 1/0007 |
| | | | 345/418 |
| 2016/0082355 A1* | 3/2016 | Kobayashi | A63F 13/71 |
| | | | 463/29 |
| 2016/0125527 A1* | 5/2016 | Marinova | G06Q 10/101 |
| | | | 705/36 R |
| 2018/0293804 A1* | 10/2018 | Lotto | H04W 4/02 |

FOREIGN PATENT DOCUMENTS

| | | |
|---|---|---|
| CN | 105487748 A | 4/2016 |
| EP | 1865408 A2 | 12/2007 |
| JP | 2000284879 A | 10/2000 |
| JP | 2003076460 A | 3/2003 |
| JP | 2008176758 A | 7/2008 |
| JP | 2014216868 A | 11/2014 |
| JP | 2015203880 A | 11/2015 |
| KR | 20100050830 A | 5/2010 |
| KR | 1020100101817 A | 9/2010 |
| KR | 1020140001362 A | 1/2014 |
| KR | 1020150105591 A | 9/2015 |
| WO | 2010146685 A1 | 12/2010 |

OTHER PUBLICATIONS

The European Patent Office (EPO) The Extended European Search Report for 16865709 12 Pages.
The State Intellectual Property Office of the People's Republic of China (SIPO) Office Action 1 for 201510810950.5 dated Jul. 24, 2019 8 Pages (including translation).
The World Intellectual Property Organization (WIPO) International Search Report for PCT/CN2016/105336 dated Feb. 21, 2017 6 Pages (including translation).
Korean Intellectual Property Office (KIPO) Office Action 1 for 20177036259 dated Apr. 19, 2019 11 Pages (including translation).
The Japan Patent Office (JPO) Office Action for Application No. 2017-553954 dated Jul. 30, 2018 9 Pages (including translation).
The European Patent Office (EPO) European Office Action 1 for 16865709.6 dated Nov. 3, 2021 12 Pages.

\* cited by examiner

METHOD AND APPARATUS FOR DISPLAYING ORBITING ICONS CORRESPONDING TO PROGRAM APPLICATION FUNCTIONS

CROSS-REFERENCES TO RELATED APPLICATIONS

This application is a continuation application of PCT Patent Application No. PCT/CN2016/105336, filed on Nov. 10, 2016, which claims priority to Chinese Patent Application No. 2015108110950.5, entitled "METHOD AND APPARATUS FOR DISPLAYING ICON" filed on Nov. 20, 2015, which is incorporated by reference in its entirety.

FIELD OF THE TECHNOLOGY

Embodiments of the present disclosure relate to the field of the Internet, and specifically, to a method and an apparatus for displaying an icon.

BACKGROUND OF THE DISCLOSURE

With broad applications of intelligent devices, types and the quantity of application programs are constantly growing. Currently, most of user interfaces of application programs on the market display related functions thereof in a static list manner. For example, a common display manner of a game inlet of a game community is listing, one by one in a list manner, related function icons of the game and user icons of a user that logs in to the game. In related technologies, the manner of displaying, in a list manner, a user icon of a user that currently logs in to an application program and related function icons thereof has the following disadvantages.

1. The user icon of the user that currently logs in to the application program and the related function icons of the application program are displayed in a list form, and therefore association between the related functions of the application program and the user that performs login cannot be reflected. For example, a function icon, which is frequently used by the user that performs login, in the application program cannot be intuitively displayed, and consequently, the user that performs login needs to search in a list each time using the function, and use experience of the user is severely reduced.

2. Long-time use of the interface in the static list form causes visual fatigue of the user. To reduce the visual fatigue of the user, in related technologies, accompanying drawings are usually replaced, or the interface is enabled to display some dynamic effects. However, the dynamic effects are also merely pure dynamic special effects, lack sufficient vividness, and have no specific meanings. Consequently, the display effect of icons on the interface is poor.

Currently, effective solutions have not been provided with respect to the problem of a poor display effect in the related technologies because the user icon of the user that currently logs in to the application program and the related function icons thereof are displayed in a list manner.

SUMMARY

Embodiments of the present disclosure provide a method and an apparatus for displaying an icon, to resolve at least the technical problem of a poor display effect in the related technologies because a user icon of a user that currently logs in to an application program and related function icons thereof are displayed in a list manner.

According to one aspect of the embodiments of the present disclosure, a method for displaying an icon is provided, including: displaying a first icon and at least one display orbit on an interface, the first icon being a user icon of a user that currently logs in to an application program, and each of the at least one display orbit being a path that uses the first icon as a center and surrounds a periphery of the first icon; obtaining a first application function activated in the application program; obtaining a first function icon of the first application function; and displaying the first function icon of the first application function on a first display orbit, the first display orbit being one of the at least one display orbit.

According to another aspect of the embodiments of the present disclosure, an apparatus for displaying an icon is provided, including: a memory, a processor coupled to the memory. The processor is configured for: displaying a first icon and at least one display orbit on an interface, the first icon being a user icon of a user that currently logs in to an application program, and each of the at least one display orbit being a path that uses the first icon as a center and surrounds a periphery of the first icon; obtaining a first application function activated in the application program; obtaining a first function icon of the first application function; and displaying the first function icon of the first application function on a first display orbit, the first display orbit being one of the at least one display orbit.

According to another aspect of the embodiments of the present disclosure, a non-transitory storage medium is provided. The storage medium is configured to store computer-executable program code for, when being executed by a processor, implementing a method for displaying an icon, the method including: displaying a first icon and at least one display orbit on an interface, the first icon being a user icon of a user that currently logs in to an application program, and each of the at least one display orbit being a path that uses the first icon as a center and surrounds a periphery of the first icon; obtaining a first application function activated in the application program; obtaining a first function icon of the first application function; and displaying the first function icon of the first application function on a first display orbit, the first display orbit being one of the at least one display orbit.

BRIEF DESCRIPTION OF THE DRAWINGS

The accompanying drawings described herein are used to provide further understanding of the present disclosure, and constitute a part of this application. Illustrative embodiments and descriptions thereof of the present disclosure are used to explain the present disclosure, and do not constitute an inappropriate limitation to the present disclosure. In the accompanying drawings.

DESCRIPTION OF EMBODIMENTS

To enable a person skilled in the art to better understand the solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

It should be noted that the terms such as "first" and "second" in the specification, the claims, and the foregoing accompanying drawings of the present disclosure are used to differentiate similar objects from each other, and are not necessarily used to describe a particular sequence or a time order. It should be understood that such used data can be exchanged with each other in suitable cases, so that the embodiments of the present disclosure described herein can be implemented in a sequence other than the sequences shown in the figures or described herein. Moreover, the terms "include", "have", and any variants thereof are intended to cover a non-exclusive inclusion. For example, in the context of a process, method, system, product or device that includes a series of steps or units, the process, method, system, product or device is not necessarily limited to the clearly listed steps or units, and instead, includes other steps or units not specified clearly, or may include inherent steps or units of the process, method, product, or device.

First, some nouns or terms that appear in the process of describing the embodiments of the present disclosure are adapted to the following explanations: first icon: a user icon of a user that currently logs in to an application program; display orbit: a path that uses the first icon as a center and surrounds a periphery of the first icon; application function: a function owned by the application program; and a function icon: an icon used to identify the application function in the application program.

According to an embodiment of the present disclosure, a method embodiment of a method for displaying an icon is provided. It should be noted that steps shown in the flowchart of the accompanying drawing can be performed, for example, in a computer system storing a group of computer executable instructions, and in addition, although a logic sequence is shown in the flowchart, in some cases, the shown or described steps may be performed in a sequence different from that described herein.

Figure 1:
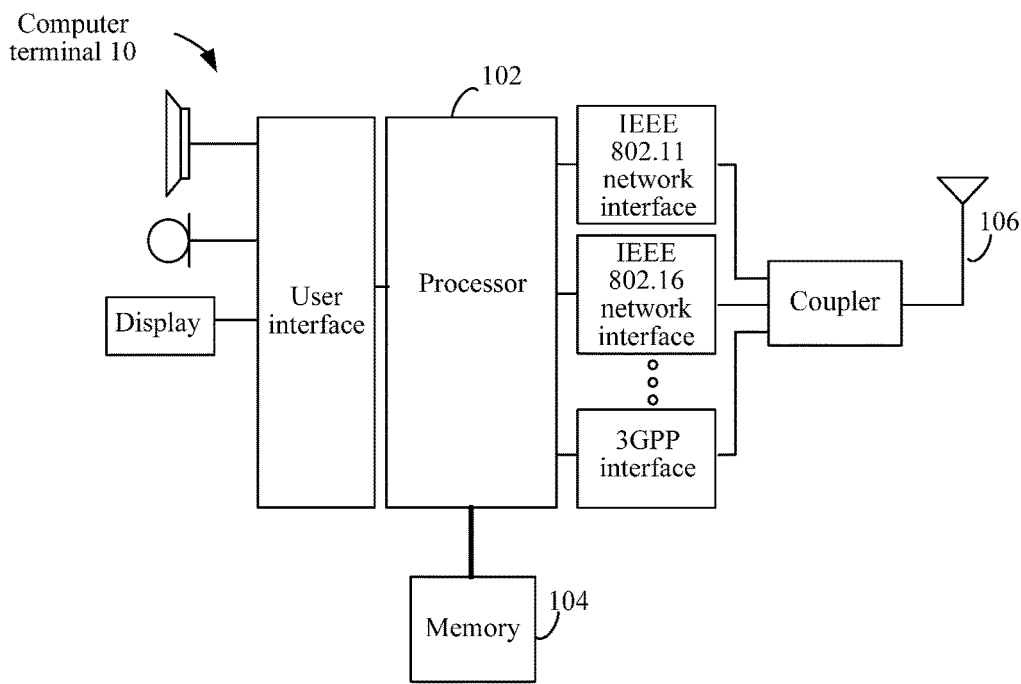
FIG. 1 is a hardware structural block diagram of a computer terminal of a method for displaying an icon according to an embodiment of the present disclosure.

The method embodiment provided in Embodiment 1 of this application may be performed in a mobile terminal, a computer terminal, or a similar computing apparatus. By using that the method embodiment is performed in a computer terminal as an example, FIG. 1 is a hardware structural block diagram of a computer terminal of a method for displaying an icon according to an embodiment of the present disclosure. As shown in FIG. 1, a computer terminal 10 may include one or more (only one is shown in the figure) processors 102 (the processors 102 may include but are not limited to processing apparatuses such as a microprocessor, a micro-controller unit (MCU), or a field programmable gate array (FPGA)), a memory 104 configured to store data, and a transmission apparatus 106 configured to perform a communications function. A person of ordinary skill in the art may understand that the structure shown in FIG. 1 is only for the purpose of illustration, and does not cause a limitation to the structure of the foregoing electronic apparatus. For example, the computer terminal 10 may also include more or fewer components than those shown in FIG. 1, or have a configuration different from that shown in FIG. 1.

The memory 104 may be configured to store a software program and module of application software, for example, program instructions/modules corresponding to the method for displaying an icon in this embodiment of the present disclosure. The processor 102 runs the software program and module stored in the memory 104, to implement various functional applications and data processing, that is, implement the method for displaying an icon. The memory 104 may include a high-speed random access memory, and may also include a nonvolatile memory, for example, one or more magnetic storage devices, flash memories or other nonvolatile solid-state memories. In some examples, the memory 104 may further include memories remotely disposed relative to the processor 102, and these remote memories may be connected to the computer terminal 100 through a network. Examples of the network include, but are not limited to, the Internet, an intranet, a local area network, a mobile communications network, or a combination thereof.

The transmission apparatus 106 is configured to receive or send data through a network. A specific example of the foregoing network may include a wireless network provided by a communication provider of the computer terminal 10. In an example, the transmission apparatus 106 includes a network interface controller (NIC) or a network adapter, which may be connected to another network device through a base station so as to perform communication with the Internet. In an embodiment, the transmission apparatus 106 may be a radio frequency (RF) module, which is configured to perform communication with the Internet in a wireless manner.

Figure 2:
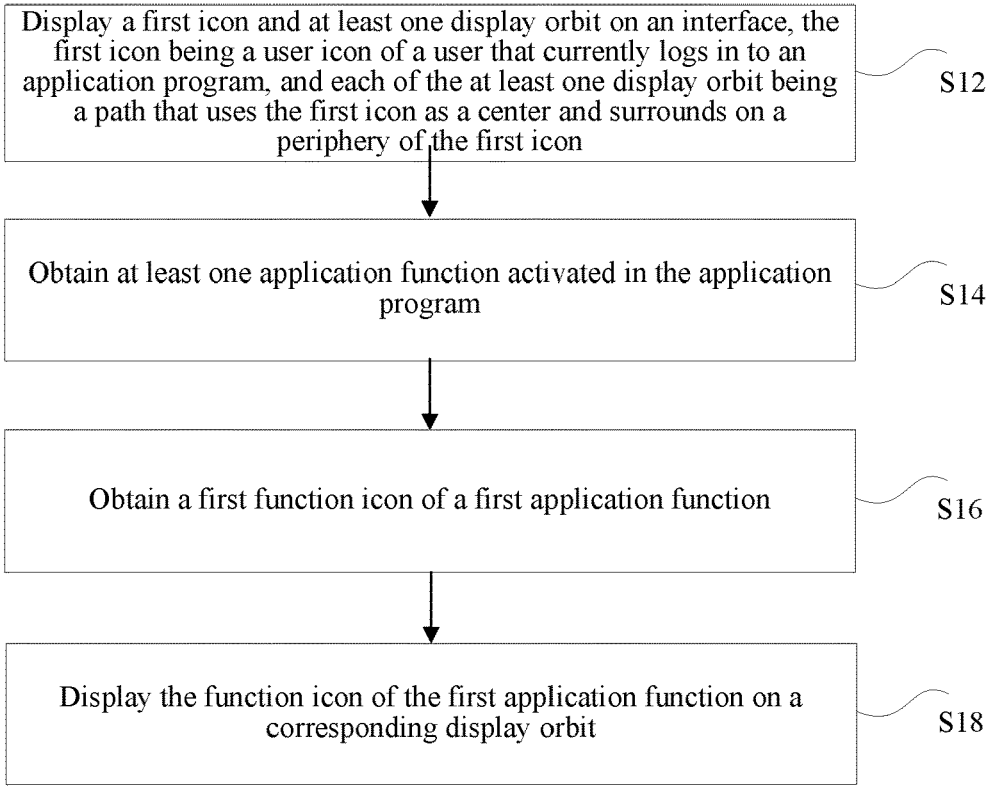
FIG. 2 is a flowchart of a method for displaying an icon according to an embodiment of the present disclosure.

Under the foregoing operating environment, this application provides the method for displaying an icon shown in FIG. 2. The method may be applied to an intelligent terminal device, and is performed by a processor in the intelligent terminal device. The intelligent terminal device may be an intelligent mobile phone, or a tablet computer. At least one application program is installed in the intelligent terminal device. This embodiment of the present disclosure does not limit the type of the application program, which may be a system application program or a software application program. The application program in this embodiment of the present disclosure includes at least one application function. For example, the application program is QQ Game, which includes multiple game application functions such as Fight the Landlord and Picture Matching.

FIG. 2 is a flowchart of a method for displaying an icon according to an embodiment of the present disclosure. As shown in FIG. 2, an optional solution of the method for displaying an icon includes the following steps:

Step S12: Display a first icon and at least one display orbit on an interface, the first icon being a user icon of a user that currently logs in to an application program, and each of the at least one display orbit being a path that uses the first icon as a center and surrounds a periphery of the first icon.

In the solution provided in the foregoing step S12 of this application, after a user logs in to any application program, an intelligent terminal device displays an interface corresponding to the application program, and a first icon and at least one display orbit may be displayed on the interface. The first icon may be a user icon of the user that currently logs in to the application program, and is used to uniquely identify the user that logs in to the application program. The first icon may be an image that includes display information such as a user portrait icon or a user signature. A position of the first icon on the interface may be correspondingly adjusted according to the size of a display screen of the terminal device, so that the interface is esthetic.

At least one display orbit is displayed on the interface. The display orbit is a path that uses the first icon as a center and surrounds on a periphery of the first icon. The shape of the display orbit on the interface may be a concentric circle, a concentric loop, or another shape that can reflect that the display orbit uses the first icon as the center and surrounds on the periphery of the first icon. This embodiment of the present disclosure does not specifically limit the shape of the display orbit, and the shape of the display orbit may be set according to actual needs. A distance between any two orbits in multiple display orbits may be the same, or may be different. However, for esthetics of display of the interface, the distance between any two display orbits on the interface of this embodiment of the present disclosure is the same. Display colors of the display orbits may be the same, or may be different. To intuitively and clearly distinguish different orbits on the interface from each other, each display orbit has a different color, that is, one display orbit uniquely corresponds to one color, or each display orbit has a different width.

Figure 3:
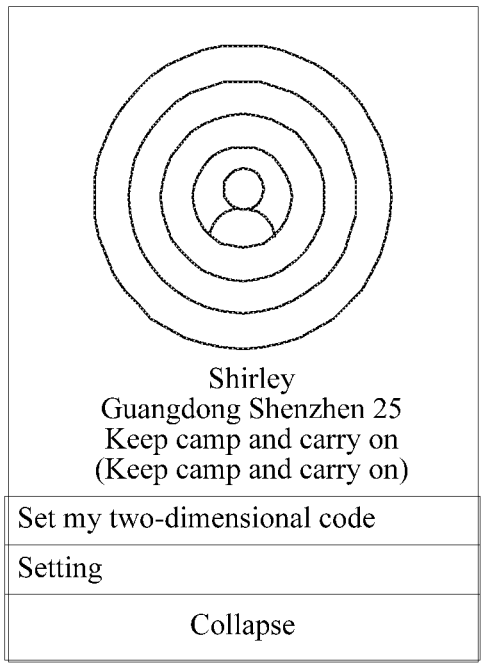
FIG. 3 is a schematic diagram of an optional display orbit according to an embodiment of the present disclosure.

By using that the shape of each display orbit included in the interface is a concentric circle as an example, FIG. 3 is a schematic diagram of an optional display orbit according to an embodiment of the present disclosure. As shown in FIG. 3, the first icon and the at least one display orbit are displayed on the display interface of the intelligent terminal device. In addition, other function options, such as "user information", "my two-dimensional code", "setting", and "collapse" are further displayed on the display interface. The first icon is a user portrait icon of a user that logs in to the application program. The display orbit is a circle that uses the user portrait icon as a center and surrounds the user portrait icon. Multiple circles all use the first icon as a center. For esthetics of the interface, the distance between any two circles in the multiple circles is the same. Optionally, the first icon and the display orbit displayed on the interface may be designed to have a flat display effect, or may be designed to have a stereoscopic effect, that is, multiple display orbits are stereoscopic surround orbits that use the user portrait icon as a center.

Optionally, the first icon and the at least one display orbit on the interface of this embodiment of the present disclosure may be designed to be dynamically displayed. For example, the first icon may jump with a small magnitude at a position, or flicker according to preset time. A movable bright dot may be designed on the display orbit. The movable bright dot may rotate around the first icon along the display orbit, on which the movable bright dot is located.

In this embodiment of the present disclosure, the first icon and the at least one display orbit may be displayed on the interface in multiple manners. The foregoing display manners are merely preferred embodiments of the present disclosure, and it is not indicated that the method for displaying an icon of this embodiment of the present disclosure includes only the foregoing display manners. To improve the display effect and esthetics of the interface, this embodiment of the present disclosure may further include other manners that can enhance the display effect of the interface, and examples are not listed herein again.

Step S14: Obtain at least one application function enabled/activated in the application program.

In some embodiments, the user can activate and operate at least one application function included in the application program (e.g., after logging in to the application program). Each application function in operation generates a corresponding function icon. The function icon is used to uniquely identify an application function corresponding thereto. The shape and content of the function icon may be designed according to a corresponding application function. For example, an icon of QQ Speed in a QQ game community is an image including text "speed".

When the application program is installed on the intelligent terminal device for the first time, some application functions in at least one application function carried in the application program are in an activated state, and the other application functions are in an inactivated state. In other words, the application program (e.g., a gaming platform program) may provide a variety of application functions (e.g., 50 different games). The user may choose to activate/enable some of the application functions (e.g., 5 of the games provided by the gaming platform program). Function icons corresponding to the application functions in the activated state are displayed on the interface corresponding to the application program, and icons of the application programs in the inactivated state are not displayed on the interface corresponding to the application program, and the user that logs in to the application program needs to activate and install the application functions in the inactivated state according to needs of the user.

Optionally, the application program in this embodiment can further support a function of adding or deleting an application function. The user that logs in to the application program can delete the application functions that are in the activated state and pre-carried in the application program, and can also add new application functions that are not carried in the application program into the application program. In this embodiment, by setting the application program to have the function of adding or deleting an application function, user needs are greatly satisfied, thereby improving use experience of the user.

In some embodiments, after the user logs in to the application program, the application functions in the activated state are correspondingly enabled, and the application functions in the inactivated state are not enabled. By detecting whether the at least one application function of the application program is in the activated state, a processor of the intelligent terminal device obtains the at least one application function enabled in the application program.

Step S16: Obtain a first function icon of a first application function. The first application function being one of the at least one application function activated in the application program.

Optionally, in this embodiment of the present disclosure, a correspondence between application functions and function icons is pre-stored in the application program. After obtaining the at least one application function enabled in the application program by using step S14, the processor obtains a function icon of the enabled application function according to the correspondence between the application functions and the function icons.

For example, after the user logs in to QQ Game, enabled application functions include Fight the Landlord, Picture Matching, and QQ Speed. An application program corresponding to the QQ Game pre-stores a function icon of Fight the Landlord, a function icon of Picture Matching, and a function icon of QQ speed. After obtaining the enabled application functions, that is, Fight the Landlord, Picture Matching, and QQ Speed, the processor of the intelligent terminal device, on which QQ Game is installed separately obtains the function icon of Fight the Landlord, the function icon of Picture Matching, and the function icon of QQ speed according to the foregoing correspondence.

According to this embodiment of the present disclosure, the correspondence between the application functions of the application program and the function icons is pre-stored, so that the processor of the intelligent terminal device can quickly find the function icons of the enabled application functions, thereby improving the computing efficiency.

Step S18: Display the first function icon of the first application function on a corresponding display orbit. In some embodiments, when multiple application functions are obtained, multiple function icons are displayed on corresponding display orbits.

The display orbit in this embodiment of the present disclosure is an orbit used for placing a function icon for display. That is, the function icon obtained by using step S16 is placed on the display orbit on the interface for display. In an optional solution provided in the foregoing step S18 of this application, the number of display orbits may be the same as that of function icons. That is, one function icon is displayed on each display orbit. When only one application function is enabled in the application program, only one display orbit surrounds on a periphery of the first icon. A function icon of the application function is displayed on the display orbit. When multiple application functions are enabled in the application program, multiple display orbits surround on the periphery of the first icon. One function icon is displayed on each display orbit.

In an optional embodiment provided in the present disclosure, when multiple function icons are displayed on the interface, a correspondence between the function icons and display orbits is determined by a use parameter of application functions corresponding to the function icons of the user that logs in to the application program. Specifically, the use parameter of the application functions of the user may be a use frequency, a use duration, time of latest use, or the like.

Figure 4:
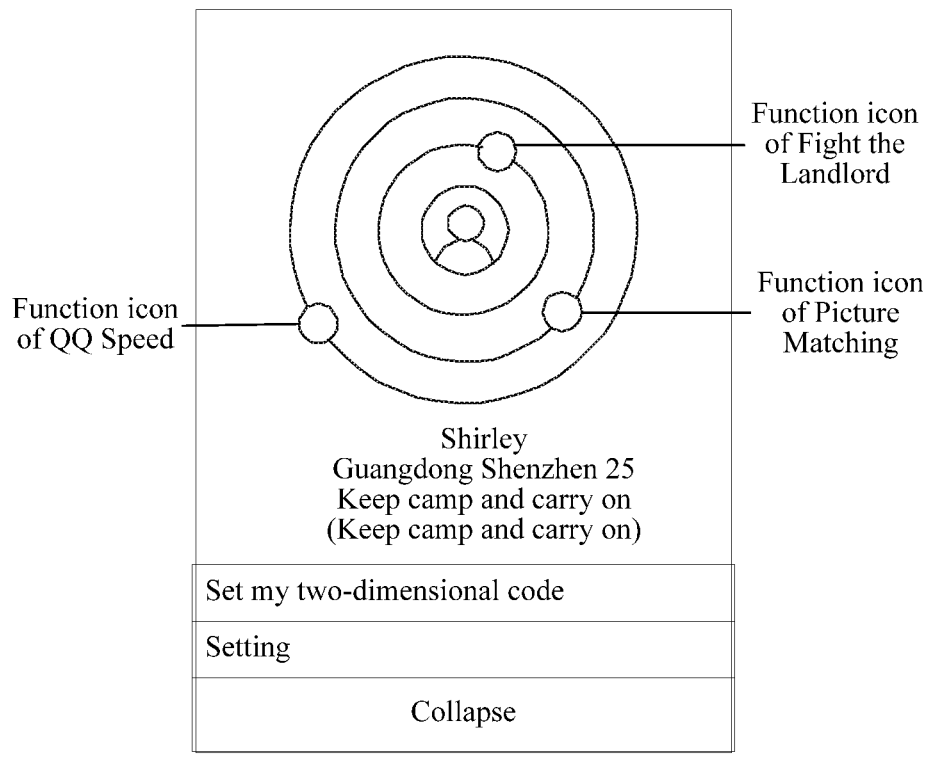
FIG. 4 is a schematic diagram showing that an optional function icon is displayed on a corresponding display orbit according to an embodiment of the present disclosure.

By using the use frequency of the application functions of the user as basis for reference, and by using that the function icons are displayed on corresponding display orbits as an example, after the user logs in to QQ Game, the enabled application functions include Fight the Landlord, Picture Matching, and QQ Speed. The use frequency of Fight the Landlord of the user that logs in to QQ Game is 7 times/week; the use frequency of Picture Matching is 5 times/week; the use frequency of QQ Speed is twice/week. FIG. 4 is a schematic diagram showing that an optional function icon is displayed on a corresponding display orbit according to an embodiment of the present disclosure. As shown in FIG. 4, three display orbits surrounding the user portrait icon are displayed on the interface. The three display orbits are respectively a first display orbit, a second display orbit, and a third display orbit in ascending order of distance from the user portrait icon. The function icon of Fight the Landlord is placed on the first display orbit; the function icon of Picture Matching is placed on the second display orbit; the function icon of QQ Speed is placed on the third display orbit in descending order of use frequency of the application functions of the user. It can be intuitively determined according to FIG. 4 that Fight the Landlord corresponding to a function icon closest to the user portrait icon is an application function that the user is relatively interested in.

In this embodiment of the present disclosure, the function icon is placed on the corresponding display orbit for display according to the use parameter of the application function of the user, so that a relationship between the user and the application function corresponding to the function icon can be intuitively displayed in a graphical form, and the user can quickly locate the position of the application function that the user is relatively interested in, thereby greatly improving use experience of the user.

By using the foregoing step S12 to step S18, according to the solution provided in the present disclosure, the user icon and the display orbit are displayed on the interface, and function icons of one or more application functions that are activated and operated by the user and are in the application program are displayed on corresponding display orbits, so as to intuitively and vividly display, in a graphical presentation manner, the user icon of the user that logs in to the application program and related function icons thereof, intuitively display a relationship between the user icon of the user that logs in to the application program and the related function icons thereof, enhance the display effect of the interface, and improve use experience of the user, thereby resolving the technical problem of a poor display effect in the related technologies because the user icon of the user that currently logs in to the application program and the related function icons thereof are displayed in a list manner.

As an optional implementation, when multiple application functions are obtained in step S14 of this application, the method for displaying an icon of this embodiment of the present disclosure may further include: obtaining use frequencies of the multiple application functions. For example, after the user logs in to QQ Game, the enabled application functions include Fight the Landlord (a card game), Picture Matching, and QQ Speed (a car racing game). After obtaining Fight the Landlord, Picture Matching, and QQ Speed, the processor in the intelligent terminal device, on which QQ Game is installed correspondingly obtains use frequencies of Fight the Landlord, Picture Matching, and QQ Speed of the user. For example, the use frequency of Fight the Landlord of the user is 7 times/week; the use frequency of Picture Matching is 5 times/week; the use frequency of QQ Speed is twice/week.

Optionally, according to the method for displaying an icon of this embodiment, after the use frequency of any application function is obtained, icons of various application functions may be placed on corresponding display orbits for display according to use frequencies of the application functions. Specifically, when multiple application functions are enabled in step S18, the step of displaying the function icon of any application function on a corresponding display orbit may include:

Step S180: sorting the use frequencies of the application functions. Optionally, in this embodiment, use frequencies of the application functions may be sorted in descending order, or may be sorted in ascending order. A sorting result of the use frequencies is used as a basis for positions where the function icons of the application functions are placed on the display orbits.

Step S182: Respectively display function icons of the multiple application functions on corresponding display orbits according to a sorting result of the use frequencies, where a function icon of an application function with a highest use frequency is displayed on a display orbit closest to the first icon. For example, as shown in FIG. 4, the function icon of Fight the Landlord with a highest use frequency is placed on the first display orbit closest to the user portrait icon; the function icon of Picture Matching with a second highest use frequency is placed on the second display orbit; the function icon of QQ Speed with a lowest use frequency is placed on the third display orbit.

As another optional implementation, when multiple application functions are obtained in step S14 of this application, the method for displaying an icon of this embodiment of the present disclosure may further include: obtaining time stamps of latest use of the multiple application functions. For example, after the user logs in to QQ Game, the enabled application functions include Fight the Landlord, Picture Matching, and QQ Speed. After obtaining Fight the Landlord, Picture Matching, and QQ Speed, the processor in the intelligent terminal device, on which QQ Game is installed correspondingly obtains time of latest use of Fight the Landlord, Picture Matching, and QQ Speed of the user. For example, time stamp of the user launching Fight the Landlord for the last time is Oct. 20, 2015; time stamp of the user launching Picture Matching for the last time is Oct. 10, 2015; time stamp of the user launching QQ Speed for the last time is Oct. 1, 2015.

Optionally, according to the method for displaying an icon of this embodiment, after the time stamps of latest use of the multiple application functions are obtained, icons of various application functions may be placed on corresponding display orbits for display according to time stamps of latest use of the application functions. Specifically, when multiple application functions are enabled in step S18, the step of displaying the function icon of any application function on a corresponding display orbit may include:

Step S181: Sort the time stamps of latest use of the multiple application functions in a chronological order.

Step S183: Respectively display function icons of the multiple application functions on corresponding display orbits according to a sorting result of the time stamps of latest use, where a function icon of an application function whose time stamp of latest use is closest to current system time is displayed on a display orbit closest to the first icon.

For example, on the interface shown in FIG. 4, the time of latest use corresponding to Fight the Landlord is closest to current time (for example, Oct. 15, 2015), then the function icon of Fight the Landlord is placed on the first display orbit closest to the user portrait icon; the time of latest use corresponding to Picture matching is relatively far from the current time, then the function icon of Picture Matching is placed on the second display orbit; the time of latest use corresponding to QQ Speed is farthest from the current time, then the function icon of QQ Speed is placed on the third display orbit.

According to the method for displaying an icon in this embodiment, a basis for positions where the function icons of application functions are placed on corresponding display orbits is set. For example, the basis is use frequencies of application functions of the user, or time when the user uses the application functions for the last time. Function icons of application functions with relatively high use frequencies or with use time relatively close to the current time are displayed on display orbits relatively close to the first icon, so that application functions that the user that logs in to the application program is relatively interested in can be clearly and intuitively reflected in a graphical manner. Moreover, function icons of application functions that the user is relatively interested in are placed on display orbits relatively close to the user icon, so that the user can quickly and accurately operate the application functions. It should be noted that the basis for positions where the function icons of application functions are placed on corresponding display orbits is not limited only to the use frequency or the time of latest use, and may alternatively be a quantity of times of use within a preset time period, a use duration of each time, or the like.

As an optional implementation, after the function icon of any application function is displayed on the corresponding display orbit in step S18 of this application, the method for displaying an icon of this embodiment may further include: adjusting a display parameter of one of the function icons according to distances between the first icon and the at least one display orbit. The display parameter of the function icon in this embodiment may include the following one or more parameters: a display luminance, a display chrominance, a display size, a display profile (an outline), and the like. Preferably, according to the method for displaying an icon of this embodiment, a basis for adjusting the display parameter of the function icon according to the distance between the first icon and each display orbit is: a value of a display parameter of a function icon, displayed on a display orbit closest to the first icon, of an application function is maximum. For example, the function icon, displayed on the display orbit closest to the first icon, of the application function is brightest, has a deepest color, has a maximum size, has a brightest profile, or the like.

Figure 5:
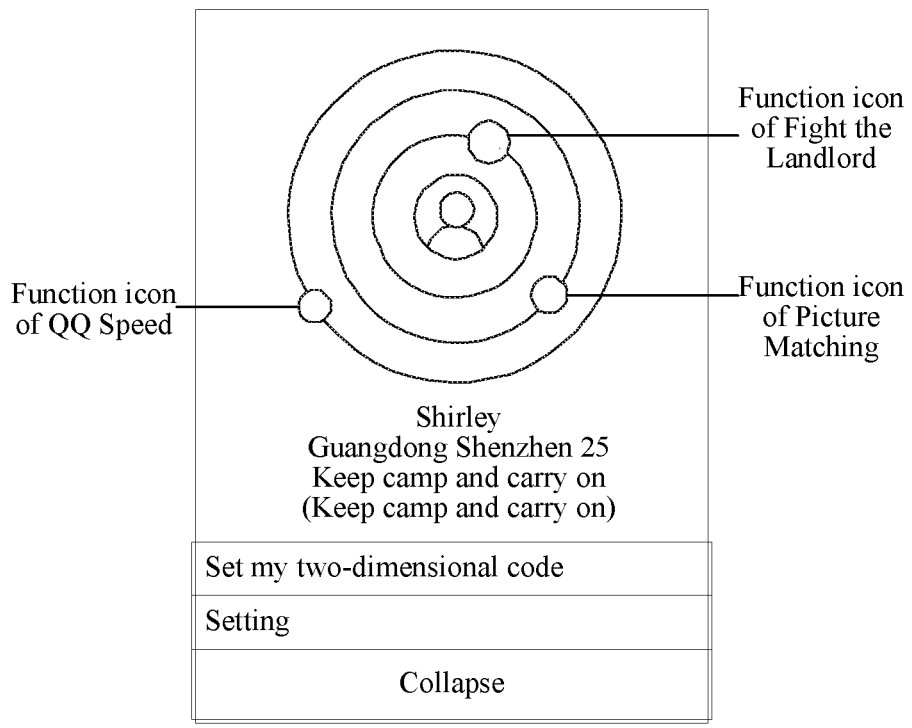
FIG. 5 is a schematic diagram showing that another optional function icon is displayed on a corresponding display orbit according to an embodiment of the present disclosure.

For example, FIG. 5 is a schematic diagram showing that another optional function icon is displayed on a corresponding display orbit according to an embodiment of the present disclosure. As shown in FIG. 5, a first display orbit is closest to the first icon (the user portrait icon), and then the size of a function icon displayed on the first display orbit is maximum; a second display orbit is relatively far from the first icon, and then the size of a function icon displayed on the second display orbit is relatively small; a third display orbit is farthest from the first icon, and then the size of a function icon on the third display orbit is minimum.

In this embodiment, display parameters of function icons are distinguished from each other, so that the user can identify function icons on different display orbits more clearly, and therefore function icons of application functions that the user is relatively interested in can be quickly and accurately determined. Moreover, the display effect of the interface is enhanced by displaying function icons with different display parameters on different display orbits.

As an optional implementation, after the function icon of any application function is displayed on the corresponding display orbit in step S18 of this application, the method for displaying an icon of this embodiment may further include: adjusting a color of the display orbit to be the same as a color of the function icon of the application function displayed on the display orbit. To clearly distinguish different display orbits on the interface from each other and distinguish function icons displayed on different display orbits from each other, in this embodiment, preferably, colors of different display orbits on the interface are distinguished from each other, and each display orbit corresponds to one color. Moreover, to increase esthetics of the display effect of the interface, in this embodiment, preferably, the color of the display orbit is adjusted to be the same as the color of the function icon displayed on the display orbit.

As an optional implementation, after the function icon of any application function is displayed on the corresponding display orbit in step S18 of this application, the method for displaying an icon of this embodiment may further include: controlling the function icon of any application function to move on the corresponding display orbit according to a preset direction. A moving direction of the function icon on the display orbit may be clockwise, or may be anti-clockwise. Moving speeds of multiple function icons on corresponding display orbits may be the same, or may be different. However, for esthetics of the effect of the interface, preferably, moving speeds of the function icons on the display orbits are adjusted to be the same.

Figure 6:
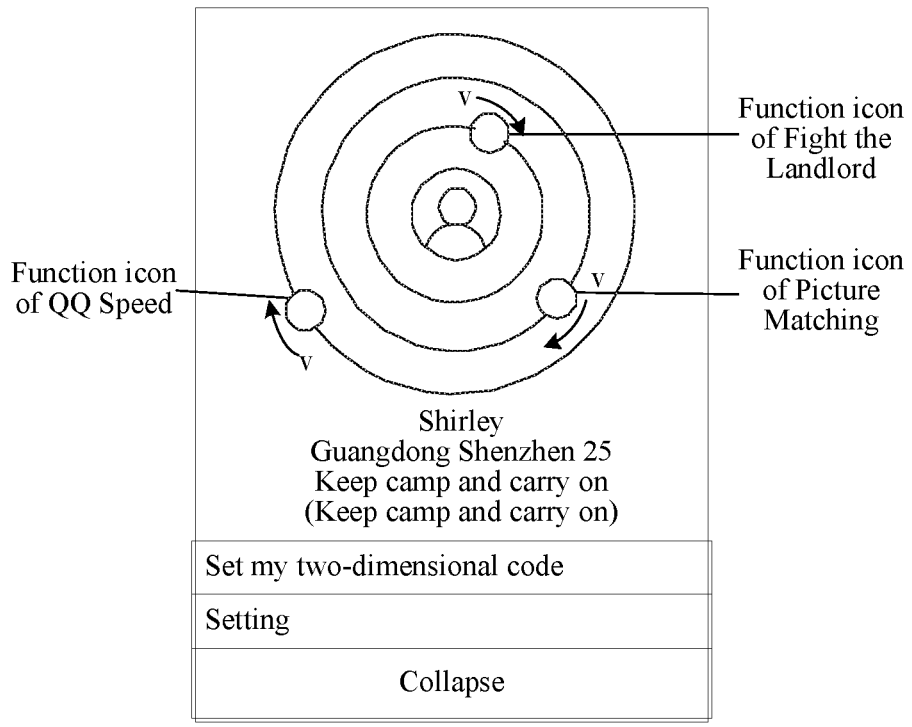
FIG. 6 is a schematic diagram showing that another optional function icon is displayed on a corresponding display orbit according to an embodiment of the present disclosure.

For example, FIG. 6 is a schematic diagram showing that another optional function icon is displayed on a corresponding display orbit according to an embodiment of the present disclosure. As shown in FIG. 6, three function icons, all surrounding the first icon, move on respective display orbits. Moving directions are all clockwise, and moving speeds are all a speed v.

According to the method for displaying an icon in this embodiment, the function icon is controlled to move around the first icon along the display orbit in a preset direction, so that the dynamic display effect of the interface is increased, thereby effectively improving use experience of the user.

As an optional implementation, after the function icon of any application function is displayed on the corresponding display orbit in step S18 of this application, the method for displaying an icon of this embodiment may further include:

Step S202: Receive a first touch signal, where the first touch signal is a signal generated by touching the function icon of the application function. For example, on the interface shown in FIG. 4, a first touch signal may be a signal generated by touching or double-touching, by the user, the function icon of Fight the Landlord, by touching and holding the function icon of Fight the Landlord, or by touching and holding the function icon of Fight the Landlord and dragging the function icon towards a direction of the first icon. The first touch signal substantively represents that the user selects, on the interface, an application function needed by the user.

Step S204: Switch the interface to a function page corresponding to the application function according to the first touch signal. For example, after receiving the first touch signal generated by touching the function icon of Fight the Landlord, the processor switches the interface to a function page of Fight the Landlord for further related operation of the user.

In this embodiment, the function icon on the interface is operated (such as touched or dragged), so that the interface can be switched to a function page of a corresponding application, and the user can easily and quickly select an application function needed by the user, thereby improving use experience of the user.

As an optional implementation, after the function icon of any application function is displayed on the corresponding display orbit in step S18 of this application, the method for displaying an icon of this embodiment may further include:

Step S212: Receive a second touch signal, where the second touch signal is a signal that shares the interface to a target object. A touch area having a sharing function is disposed on the interface of this embodiment. The user can share the interface to a target object by touching the area. The target object may be a friend in a contact list, a friend circle of WeChat, or the like.

Step S214: Obtain a screenshot of the interface. After receiving a second touch signal, the processor obtains a screenshot of the interface. This embodiment of the present disclosure does not particularly limit a manner of obtaining the screenshot of the interface. The screenshot of the interface may be obtained by means of screen snapshot, screen screenshot, or the like.

Step S216: Send the screenshot of the interface to the target object according to the second touch signal. Optionally, when sending the screenshot of the interface to the target object, the processor can further provide, to the user, a function of making supplementary description to the shared screenshot of the interface. The user can make supplementary description to the shared screenshot of the interface, so as to enable other users to increase interest for the application program.

In this embodiment, the sharing function of the application program is provided to the user, so that the interaction between the user and friends is increased, thereby not only improving use experience of the user, but also increasing user groups of the application program.

As an optional implementation, in this embodiment of the present disclosure, both an orbit parameter of the display orbit and an icon parameter of the function icon displayed on the corresponding display orbit change in real time, where the orbit parameter may include the following one or more parameters: an orbit line color, an orbit line thickness, an orbit motion status, an orbit rotation direction, and a distance between any two orbits (e.g., a distance to a neighboring orbit or the first icon), and the icon parameter may include the following one or more parameters: an icon color, an icon size, an icon shape, and an icon moving direction.

In this embodiment, the orbit parameter of the display orbit and the icon parameter of the function icon on the display orbit are adjusted in real time according to the use parameter of the application function of the application program of the user. Each time the user performs an operation on the application function of the application program, the processor updates the use parameter of the application function of the application program once, and then the orbit parameter of the display orbit and the icon parameter of the function icon on the display orbit are adjusted according to the updated use parameter. In this embodiment, the orbit parameter of the display orbit and the icon parameter of the function icon on the display orbit are adjusted in real time, so that the accuracy of reading, from the interface, association between the user and the application function is improved, and moreover, visual fatigue caused by long-time use of a same interface by the user is avoided, thereby greatly improving use experience of the user.

It should be noted that, for the foregoing various method embodiments, for ease of description, the method embodiments are all expressed into a series of action combinations. However, a person skilled in the art should know that the present disclosure is not limited by a sequence of described actions because some steps may use other sequences or may be simultaneously performed according to the present disclosure. Secondly, a person skilled in the art should also know that the embodiments described in the specification are all preferred embodiments, and actions and modules involved in the embodiments are not necessarily needed by the present disclosure.

By means of the description of the foregoing implementations, a person skilled in the art can clearly learn that the methods according to the foregoing embodiments may be implemented by means of software and necessary commodity hardware platforms, and certainly, may alternatively be implemented by hardware. However, in many cases, the former is a better implementation. Based on such an understanding, the technical solutions of the present disclosure essentially, or the part contributing to related technologies may be implemented in a form of a software product. The computer software product is stored in a storage medium (such as a read-only memory (ROM)/random access memory (RAM), a magnetic disk, or an optical disc) and includes several instructions for instructing a computer device (which may be a mobile phone, a computer, a server, a network device, or the like) to perform the methods described in the embodiments of the present disclosure.

Figure 7:
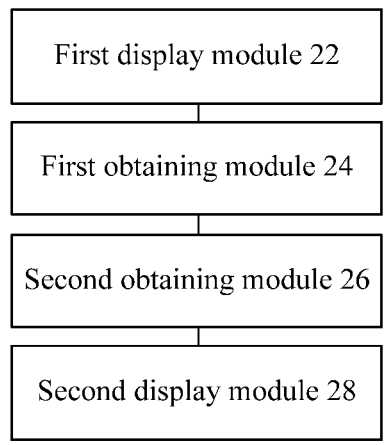
FIG. 7 is a schematic diagram of an apparatus for displaying an icon according to an embodiment of the present disclosure.

According to an embodiment of the present disclosure, an apparatus for displaying an icon for performing the foregoing method for displaying an icon is further provided. FIG. 7 is a schematic diagram of an apparatus for displaying an icon according to an embodiment of the present disclosure. As shown in FIG. 7, the apparatus includes multiple program modules, including: a first display module 22, a first obtaining module 24, a second obtaining module 26, and a second display module 28. The multiple program modules may be stored in a memory of the apparatus and be executed by a processor coupled to the memory.

The first display module 22 is configured to display a first icon and at least one display orbit on an interface, the first icon being a user icon of a user that currently logs in to an application program, and the display orbit being a path that uses the first icon as a center and surrounds on a periphery of the first icon. The first obtaining module 24 is configured to obtain at least one application function enabled in the application program. The second obtaining module 26 is configured to obtain a function icon of any application function. The second display module 28 is configured to display the function icon of any application function on a corresponding display orbit.

In the apparatus for displaying an icon of this embodiment, the first display module 22 may be configured to perform step S12 of the foregoing embodiment of the present disclosure; the first obtaining module 24 may be configured to perform step S14 of the foregoing embodiment of the present invention; the second obtaining module 26 may be configured to perform step S16 of the foregoing embodiment of the present disclosure; the second display module 28 is configured to perform step S18 of the foregoing embodiment of the present disclosure.

By using the foregoing modules: the first display module 22, the first obtaining module 24, the second obtaining module 26, and the second display module 28, the user icon and the display orbit are displayed on the interface, and the function icon is displayed on the corresponding display orbit according to a use parameter of an application function in the application program of the user, so as to intuitively and vividly display, in a graphical presentation manner, the user icon of the user that logs in to the application program and related function icons thereof, intuitively display a relationship between the user icon of the user that logs in to the application program and the related function icons thereof, enhance the display effect of the interface, and improve use experience of the user, thereby resolving the technical problem of a poor display effect in the related technologies because the user icon of the user that currently logs in to the application program and the related function icons thereof are displayed in a list manner.

The foregoing first display module 22 in this application may be configured to display the first icon and the at least one display orbit. The first icon may be a user icon of the user that currently logs in to the application program, and is used to uniquely identify the user that logs in to the application program. The first icon may be an image that includes display information such as a user portrait icon or a user signature. A position of the first icon on the interface may be correspondingly adjusted according to the size of a display screen of a terminal device, so that the interface is esthetic.

The display orbit is a path that uses the first icon as a center and surrounds on a periphery of the first icon. The shape of the display orbit on the interface may be a concentric circle, a concentric loop, or another shape that can reflect that the display orbit uses the first icon as the center and surrounds on the periphery of the first icon. This embodiment of the present disclosure does not specifically limit the shape of the display orbit, and the shape of the display orbit may be set according to actual needs. A distance between any two orbits in multiple display orbits may be the same, or may be different. However, for esthetics of display of the interface, the distance between any two display orbits on the interface of this embodiment of the present disclosure is the same. Display colors of the display orbits may be the same, or may be different. To intuitively and clearly distinguish different orbits on the interface from each other, each display orbit has a different color, that is, one display orbit uniquely corresponds to one color, or each display orbit has a different width.

The first icon and the at least one display orbit displayed by the foregoing first display module 22 on the interface may present a flat display effect, or present a stereoscopic display effect. Optionally, the foregoing first display module 22 may dynamically display the first icon and the at least one display orbit. For example, the first icon may jump with a small magnitude at a position, or flicker according to preset time. A movable bright dot may be designed on the display orbit. The movable bright dot may rotate around the first icon along the display orbit, on which the movable bright dot is located.

The foregoing first display module 22 may display the first icon and the at least one display orbit on the interface in multiple manners. The foregoing display manners are merely preferred embodiments of the present disclosure, and it is not indicated that the foregoing first display module 22 includes only the foregoing display manners. To improve the display effect and esthetics of the interface, this embodiment of the present disclosure may further include other manners that can enhance the display effect of the interface, and examples are not listed herein again.

In the foregoing first obtaining module 24, after logging in to the application program, the user can activate and operate at least one application function included in the application program. Each application function in operation generates a corresponding function icon. The function icon is used to uniquely identify an application function corresponding thereto. The shape and content of the function icon may be designed according to a corresponding application function. For example, an icon of QQ Speed in a QQ game community is an image including text "speed".

When the application program is installed on the intelligent terminal device for the first time, some application functions in at least one application function carried in the application program are in an activated state, and the other application functions are in an inactivated state. Function icons corresponding to the application functions in the activated state are displayed on the interface corresponding to the application program, and icons of the application programs in the inactivated state are not displayed on the interface corresponding to the application program, and the user that logs in to the application program needs to activate and install the application functions in the inactivated state according to needs of the user.

Optionally, the application program in the foregoing first obtaining module 24 can further support a function of adding or deleting an application function. The user that logs in to the application program can delete the application functions that are in the activated state and pre-carried in the application program, and can also add new application functions that are not carried in the application program into the application program. In this embodiment, by setting the application program to have the function of adding or deleting an application function, user needs are greatly satisfied, thereby improving use experience of the user.

In some embodiments, after the user logs in to the application program, the application functions in the activated state are correspondingly enabled, and the application functions in the inactivated state are not enabled. By detecting whether the at least one application function of the application program is in the activated state, the foregoing first obtaining module 24 obtains the at least one application function enabled in the application program.

Optionally, in this embodiment of the present disclosure, a correspondence between application functions and function icons is pre-stored in the application program. After the at least one application function enabled in the application program is obtained by using the foregoing first obtaining module 24, the foregoing second obtaining module 26 obtains a function icon of the enabled application function according to the correspondence between the application functions and the function icons.

For example, after the user logs in to QQ Game, enabled application functions include Fight the Landlord, Picture Matching, and QQ Speed. An application program corresponding to the QQ Game pre-stores a function icon of Fight the Landlord, a function icon of Picture Matching, and a function icon of QQ speed. After the enabled application functions, that is, Fight the Landlord, Picture Matching, and QQ Speed are obtained by the foregoing first obtaining module 24, the foregoing second obtaining module 26 separately obtains the function icon of Fight the Landlord, the function icon of Picture Matching, and the function icon of QQ speed according to the foregoing correspondence.

According to this embodiment of the present disclosure, the correspondence between the application functions of the application program and the function icons is pre-stored, so that the processor of the intelligent terminal device can quickly find the function icons of the enabled application functions, thereby improving the computing efficiency.

The display orbit in the foregoing second display module 28 is an orbit used for placing a function icon for display. That is, the function icon obtained by the second obtaining module 26 is placed on the display orbit on the interface for display. In the foregoing second display module 28, as an optional implementation, the number of display orbits may be the same as that of function icons. That is, one function icon is displayed on each display orbit. When only one application function is enabled in the application program, only one display orbit surrounds on a periphery of the first icon. A function icon of the application function is displayed on the display orbit. When multiple application functions are enabled in the application program, multiple display orbits surround on the periphery of the first icon. One function icon is displayed on each display orbit.

In an optional embodiment provided in the present disclosure, when multiple function icons are displayed on the interface, a correspondence between the function icons and display orbits is determined by a use parameter of application functions corresponding to the function icons of the user that logs in to the application program. Specifically, the use parameter of the application functions of the user may be a use frequency, a use duration, time of latest use, or the like.

By using the use frequency of the application functions of the user as basis for reference, and by using that the function icons are displayed on corresponding display orbits as an example, after the user logs in to QQ Game, the enabled application functions include Fight the Landlord, Picture Matching, and QQ Speed. The use frequency of Fight the Landlord of the user that logs in to QQ Game is 7 times/week; the use frequency of Picture Matching is 5 times/week; the use frequency of QQ Speed is twice/week. As shown in FIG. 4, three display orbits surrounding the user portrait icon are displayed on the interface. The three display orbits are respectively a first display orbit, a second display orbit, and a third display orbit in ascending order of distance from the user portrait icon. The function icon of Fight the Landlord is placed on the first display orbit; the function icon of Picture Matching is placed on the second display orbit; the function icon of QQ Speed is placed on the third display orbit in descending order of use frequency of the application functions of the user. It can be intuitively determined according to FIG. 4 that Fight the Landlord corresponding to a function icon closest to the user portrait icon is an application function that the user is relatively interested in.

In this embodiment of the present disclosure, the function icon is placed on the corresponding display orbit for display according to the use parameter of the application function of the user, so that a relationship between the user and the application function corresponding to the function icon can be intuitively displayed in a graphical form, and the user can quickly locate the position of the application function that the user is relatively interested in, thereby greatly improving use experience of the user.

Figure 8:
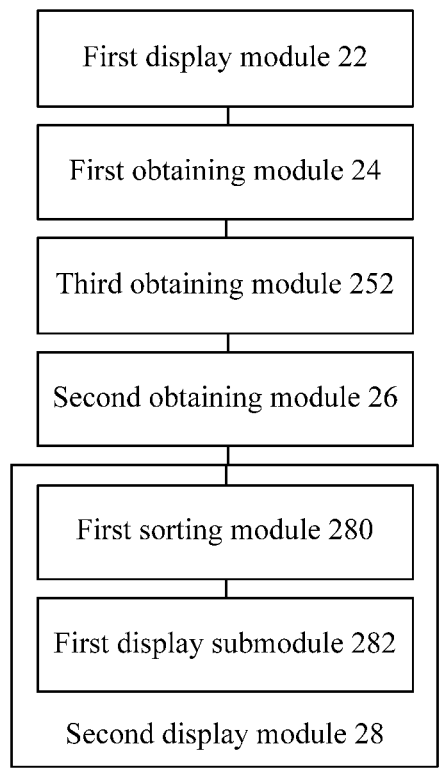
FIG. 8 is a schematic diagram of an optional apparatus for displaying an icon according to an embodiment of the present disclosure.

As an optional implementation, FIG. 8 is a schematic diagram of an optional apparatus for displaying an icon according to an embodiment of the present disclosure. As shown in FIG. 8, the apparatus for displaying an icon may further include: a third obtaining module 252, configured to obtain a use frequency of any application function. For example, after the user logs in to QQ Game, the enabled application functions include Fight the Landlord, Picture Matching, and QQ Speed. After Fight the Landlord, Picture Matching, and QQ Speed are obtained by the first obtaining module 24, the third obtaining module 252 correspondingly obtains use frequencies of Fight the Landlord, Picture Matching, and QQ Speed of the user. For example, the use frequency of Fight the Landlord of the user is 7 times/week; the use frequency of Picture Matching is 5 times/week; the use frequency of QQ Speed is twice/week.

Optionally, as shown in FIG. 8, the second display module 28 may include: a first sorting module 280, configured to sort use frequencies of the application functions; and a first display submodule 282, configured to respectively display function icons of the application functions on corresponding display orbits according to a sorting result of the use frequencies, where a function icon of an application function with a highest use frequency is displayed on a display orbit closest to the first icon.

The first sorting module 280 may sort use frequencies of the application functions in descending order, or in ascending order. A sorting result of the use frequencies is used as a basis for positions where the function icons of the application functions are placed on the display orbits. For example, as shown in FIG. 4, the function icon of Fight the Landlord with a highest use frequency is placed on the first display orbit closest to the user portrait icon; the function icon of Picture Matching with a second highest use frequency is placed on the second display orbit; the function icon of QQ Speed with a lowest use frequency is placed on the third display orbit.

Figure 9:
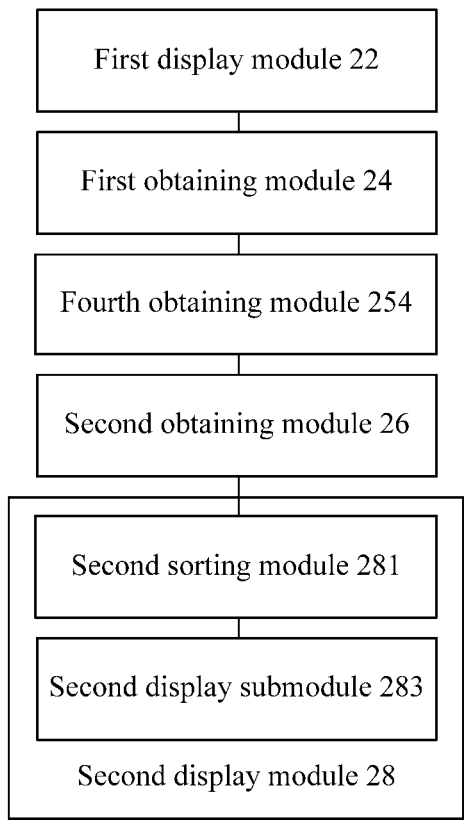
FIG. 9 is a schematic diagram of another optional apparatus for displaying an icon according to an embodiment of the present disclosure.

As another optional implementation, FIG. 9 is a schematic diagram of another optional apparatus for displaying an icon according to an embodiment of the present disclosure. As shown in FIG. 9, the apparatus for displaying an icon may further include: a fourth obtaining module 254, configured to obtain time of latest use of any application function. For example, after the user logs in to QQ Game, the enabled application functions include Fight the Landlord, Picture Matching, and QQ Speed. After Fight the Landlord, Picture Matching, and QQ Speed are obtained by the foregoing first obtaining module 24, the fourth obtaining module correspondingly obtains time of latest use of Fight the Landlord, Picture Matching, and QQ Speed of the user. For example, time when the user uses Fight the Landlord for the last time is Oct. 20, 2015; time when the user uses Picture Matching for the last time is Oct. 10, 2015; time when the user uses QQ Speed for the last time is Oct. 1, 2015.

Optionally, the second display module 28 may further include: a second sorting module 281, configured to sort time of latest use of the application functions according to a time sequence; and a second display submodule 283, configured to respectively display function icons of the application functions on corresponding display orbits according to a sorting result of the time of latest use, where a function icon of an application function whose time of latest use is closest to current system time is displayed on a display orbit closest to the first icon.

For example, on the interface shown in FIG. 4, the time of latest use corresponding to Fight the Landlord is closest to current time (for example, Oct. 15, 2015), then the function icon of Fight the Landlord is placed on the first display orbit closest to the user portrait icon; the time of latest use corresponding to Picture matching is relatively far from the current time, then the function icon of Picture Matching is placed on the second display orbit; the time of latest use corresponding to QQ Speed is farthest from the current time, then the function icon of QQ Speed is placed on the third display orbit.

According to the apparatus for displaying an icon in this embodiment, a basis for positions where the function icons of application functions are placed on corresponding display orbits is set by the third obtaining module 252 or the fourth obtaining module 254. For example, the basis is use frequencies of application functions of the user, or time when the user uses the application functions for the last time. Function icons of application functions with relatively high use frequencies or with use time relatively close to the current time are displayed on display orbits relatively close to the first icon, so that application functions that the user that logs in to the application program is relatively interested in can be clearly and intuitively reflected in a graphical manner. Moreover, function icons of application functions that the user is relatively interested in are placed on display orbits relatively close to the user icon, so that the user can quickly and accurately operate the application functions. It should be noted that the basis for positions where the function icons of application functions are placed on corresponding display orbits is not limited only to the use frequency or the time of latest use, and may alternatively be a quantity of times of use within a preset time period, a use duration of each time, or the like.

Figure 10:
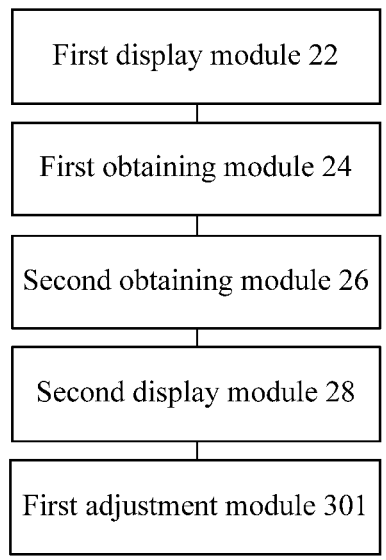
FIG. 10 is a schematic diagram of another optional apparatus for displaying an icon according to an embodiment of the present disclosure.

As an optional implementation, FIG. 10 is a schematic diagram of another optional apparatus for displaying an icon according to an embodiment of the present disclosure. As shown in FIG. 10, the apparatus for displaying an icon may further include: a first adjustment module 301, configured to adjust a display parameter of the function icon of any application function according to a distance between the first icon and each display orbit, where the display parameter may include the following one or more parameters: a display luminance, a display chrominance, a display size, and a display profile; and a value of a display parameter of a function icon of an application function displayed on the display orbit closest to the first icon is maximum.

Preferably, a basis for adjusting, by the first adjustment module 301, the display parameter of the function icon according to the distance between the first icon and each display orbit is: a value of a display parameter of a function icon, displayed on the display orbit closest to the first icon, of an application function is maximum. For example, the function icon, displayed on the display orbit closest to the first icon, of the application function is brightest, has a deepest color, has a maximum size, has a brightest profile, or the like.

For example, as shown in FIG. 5, a first display orbit is closest to the first icon (the user portrait icon), and then the size of a function icon displayed on the first display orbit is maximum; a second display orbit is relatively far from the first icon, and then the size of a function icon displayed on the second display orbit is relatively small; a third display orbit is farthest from the first icon, and then the size of a function icon on the third display orbit is minimum.

In this embodiment, display parameters of function icons are distinguished from each other, so that the user can identify function icons on different display orbits more clearly, and therefore function icons of application functions that the user is relatively interested in can be quickly and accurately determined. Moreover, the display effect of the interface is enhanced by displaying function icons with different display parameters on different display orbits.

Figure 11:
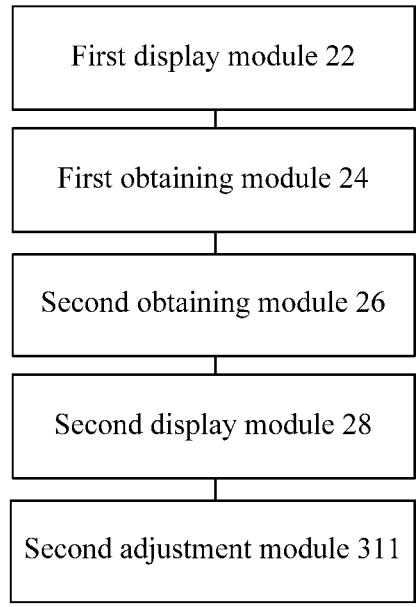
FIG. 11 is a schematic diagram of another optional apparatus for displaying an icon according to an embodiment of the present disclosure.

As an optional implementation, FIG. 11 is a schematic diagram of another optional apparatus for displaying an icon according to an embodiment of the present disclosure. As shown in FIG. 11, the apparatus for displaying an icon may further include: a second adjustment module 311, configured to adjust a color of the display orbit to be the same as a color of the function icon of the application function displayed on the display orbit. To clearly distinguish different display orbits on the interface from each other and distinguish function icons displayed on different display orbits from each other, the second adjustment module 311 of this embodiment preferably distinguishes colors of different display orbits on the interface from each other, and each display orbit corresponds to one color. Moreover, to increase esthetics of the display effect of the interface, the second adjustment module 311 of this embodiment preferably adjusts the color of the display orbit to be the same as the color of the function icon displayed on the display orbit.

Figure 12:
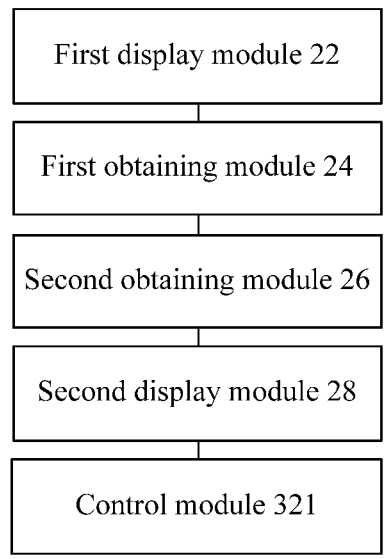
FIG. 12 is a schematic diagram of another optional apparatus for displaying an icon according to an embodiment of the present disclosure.

As an optional implementation, FIG. 12 is a schematic diagram of another optional apparatus for displaying an icon according to an embodiment of the present disclosure. As shown in FIG. 12, the apparatus for displaying an icon may further include: a control module 321, configured to control the function icon of any application function to move on the corresponding display orbit according to a preset direction. A moving direction of the function icon on the display orbit may be clockwise, or may be anti-clockwise. Moving speeds of multiple function icons on corresponding display orbits may be the same, or may be different. However, for esthetics of the effect of the interface, preferably, moving speeds of the function icons on the display orbits are adjusted to be the same.

For example, as shown in FIG. 6, three function icons, all surrounding the first icon, move on respective display orbits. Moving directions are all clockwise, and moving speeds are all a speed v.

The control module of this embodiment controls the function icon to move around the first icon along the display orbit in a preset direction, so that the dynamic display effect of the interface is increased, thereby effectively improving use experience of the user.

Figure 13:
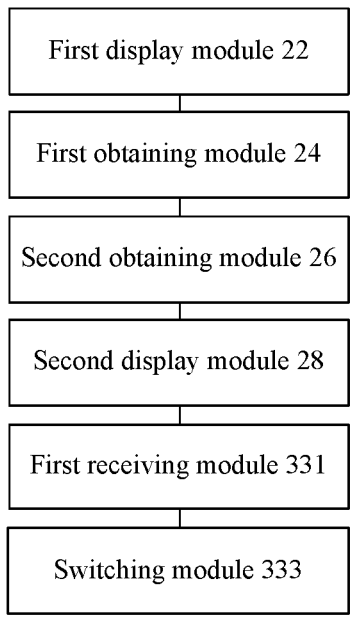
FIG. 13 is a schematic diagram of another optional apparatus for displaying an icon according to an embodiment of the present disclosure.

As an optional implementation, FIG. 13 is a schematic diagram of another optional apparatus for displaying an icon according to an embodiment of the present disclosure. As shown in FIG. 13, the apparatus for displaying an icon may further include: a first receiving module 331, configured to receive a first touch signal, where the first touch signal is a signal generated by touching the function icon of the application function; and a switching module 333, configured to switch the interface to a function page corresponding to the application function according to the first touch signal.

For example, on the interface shown in FIG. 4, a first touch signal may be a signal generated by touching or double-touching, by the user, the function icon of Fight the Landlord, by touching and holding the function icon of Fight the Landlord, or by touching and holding the function icon of Fight the Landlord and dragging the function icon towards a direction of the first icon. The first touch signal substantively represents that the user selects, on the interface, an application function needed by the user. In this embodiment, the function icon on the interface is operated (such as touched or dragged), so that the interface can be switched to a function page of a corresponding application, and the user can easily and quickly select an application function needed by the user, thereby improving use experience of the user.

Figure 14:
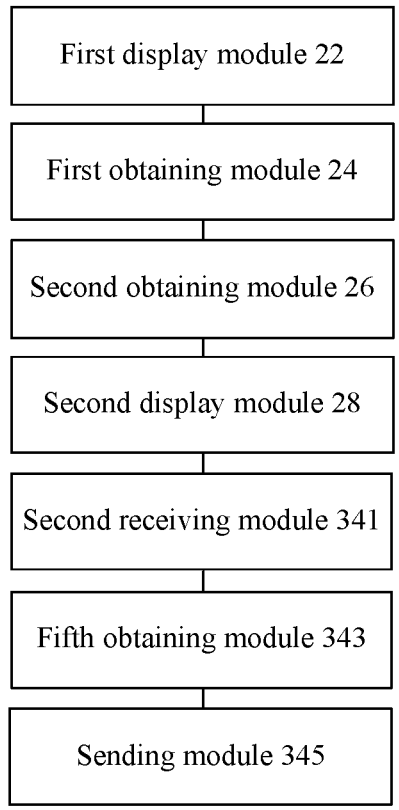
FIG. 14 is a schematic diagram of another optional apparatus for displaying an icon according to an embodiment of the present disclosure.

As an optional implementation, FIG. 14 is a schematic diagram of another optional apparatus for displaying an icon according to an embodiment of the present disclosure. As shown in FIG. 14, the apparatus for displaying an icon may further include: a second receiving module 341, configured to receive a second touch signal, where the second touch signal is a signal that shares the interface to a target object; a fifth obtaining module 343, configured to obtain a screenshot of the interface; and a sending module 345, configured to send the screenshot of the interface to the target object according to the second touch signal.

A touch area having a sharing function is disposed on the interface of this embodiment. The user can share the interface to a target object by touching the area. The target object may be a friend in a contact list, a friend circle of WeChat, or the like. This embodiment does not particularly limit a manner of obtaining the screenshot of the interface. The screenshot of the interface may be obtained by means of screen snapshot, screen screenshot, or the like. Optionally, when sending the screenshot of the interface to the target object, the sending module can further provide, to the user, a function of making supplementary description to the shared screenshot of the interface. The user can make supplementary description to the shared screenshot of the interface, so as to enable other users to increase interest for the application program.

In this embodiment, the sharing function of the application program is provided to the user, so that the interaction between the user and friends is increased, thereby not only improving use experience of the user, but also increasing user groups of the application program.

As an optional implementation, in this embodiment of the present disclosure, both an orbit parameter of the display orbit and an icon parameter of the function icon displayed on the corresponding display orbit change in real time, where the orbit parameter may include the following one or more parameters: an orbit line color, an orbit line thickness, an orbit motion status, an orbit rotation direction, and a distance between any two orbits, and the icon parameter may include the following one or more parameters: an icon color, an icon size, an icon shape, and an icon moving direction.

In this embodiment, the orbit parameter of the display orbit and the icon parameter of the function icon on the display orbit are adjusted in real time according to the use parameter of the application function of the application program of the user. Each time the user performs an operation on the application function of the application program, the processor updates the use parameter of the application function of the application program once, and then the orbit parameter of the display orbit and the icon parameter of the function icon on the display orbit are adjusted according to the updated use parameter. In this embodiment, the orbit parameter of the display orbit and the icon parameter of the function icon on the display orbit are adjusted in real time, so that the accuracy of reading, from the interface, association between the user and the application function is improved, and moreover, visual fatigue caused by long-time use of a same interface by the user is avoided, thereby greatly improving use experience of the user.

An embodiment of the present disclosure further provides a storage medium (e.g., a non-transitory computer-readable storage medium). Optionally, in this embodiment, the foregoing storage medium can be configured to store a program code executed by a method for displaying an icon in the foregoing embodiment.

Optionally, in this embodiment, the foregoing storage medium may be located in at least one network device of multiple network devices of a computer network.

Optionally, in this embodiment, the storage medium is configured to store a program code for performing the following steps:

S1: Display a first icon and at least one display orbit on an interface, the first icon being a user icon of a user that currently logs in to an application program, and each of the at least one display orbit being a path that uses the first icon as a center and surrounds on a periphery of the first icon;

S2: Obtain a first application function activated in the application program;

S3: Obtain a first function icon of the first application function; and

S4: Display the first function icon of the first application function on a first display orbit, the first display orbit being one of the at least one display orbit.

Optionally, the storage medium is further configured to store a program code for performing the following steps: obtaining multiple application functions activated in the application program; obtaining use frequencies of the multiple application functions; sorting the use frequencies of the multiple application functions; and respectively displaying function icons of the multiple application functions on corresponding display orbits according to a sorting result of the use frequencies, wherein a function icon of an application function with a highest use frequency is displayed on a display orbit closest to the first icon.

Optionally, the storage medium is further configured to store a program code for performing the following steps: obtaining multiple application functions activated in the application program; obtaining time stamps of latest use of the multiple application functions; sorting the time stamps of latest use of the multiple application functions in a chronological order; and respectively displaying function icons of the multiple application functions on corresponding display orbits according to a sorting result of the time stamps of latest use, wherein a function icon of an application function whose time stamp of latest use is closest to current system time is displayed on a display orbit closest to the first icon.

Optionally, the storage medium is further configured to store a program code for performing the following steps: adjusting a display parameter of the function icon of any application function according to a distance between the first icon and each display orbit, the display parameter including the following one or more parameters: a display luminance, a display chrominance, a display size, and a display profile; and a value of a display parameter of a function icon of an application function displayed on the display orbit closest to the first icon is maximum.

Optionally, the storage medium is further configured to store a program code for performing the following step: adjusting a color of the first display orbit to be same as a color of the first function icon of the first application function.

Optionally, the storage medium is further configured to store a program code for performing the following step: controlling the first function icon of the first application function to move on the first display orbit according to a preset direction.

Optionally, the storage medium is further configured to store a program code for performing the following steps: receiving a first touch signal generated by touching the first function icon of the first application function; and switching the interface to a function page corresponding to the first application function according to the first touch signal.

Optionally, the storage medium is further configured to store a program code for performing the following steps: receiving a second touch signal corresponding to sharing the interface to a target object; obtaining a screenshot of the interface; and sending the screenshot of the interface to the target object according to the second touch signal. Optionally, the storage medium is further configured to store a program code for performing the following steps: changing an orbit parameter of the first display orbit and an icon parameter of the first function icon displayed on the first display orbit in real time, wherein the orbit parameter comprises at least one of: an orbit line color, an orbit line thickness, an orbit motion status, an orbit rotation direction, or a distance to a neighboring orbit or the first icon, and the icon parameter comprises at least one of: an icon color, an icon size, an icon shape, or an icon moving direction.

Optionally, in this embodiment, the foregoing storage medium may include but is not limited to: various media that can store program codes such as a USB flash drive, an ROM, an RAM, a removable hard disk, a magnetic disk, or an optical disc.

An embodiment of the present disclosure further provides a computer terminal, which may be any computer terminal device in a computer terminal group. Optionally, in this embodiment, the foregoing computer terminal may alternatively be replaced as a terminal device such as a mobile terminal.

Optionally, in this embodiment, the foregoing computer terminal may be located in at least one network device of multiple network devices of a computer network.

Figure 15:
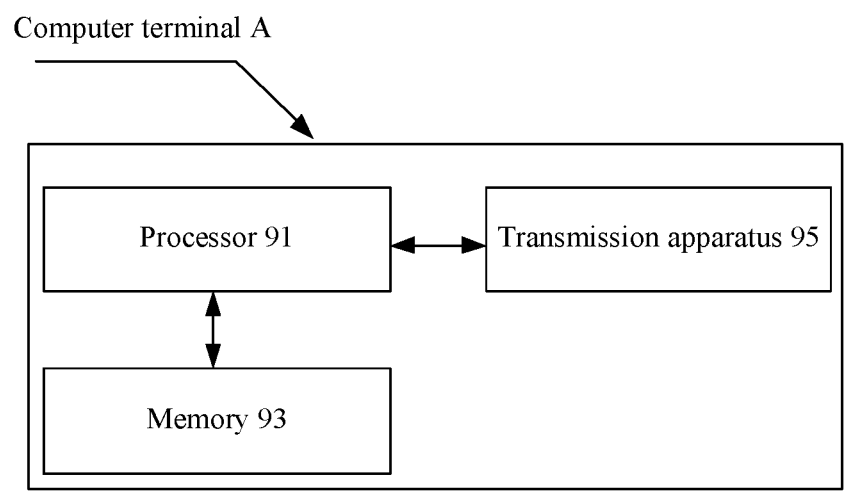
FIG. 15 is a structural block diagram of a computer terminal according to an embodiment of the present disclosure.

Optionally, FIG. 15 is a structural block diagram of a computer terminal according to an embodiment of the present disclosure. As shown in FIG. 15, the computer terminal A may include: one or more (only one is shown in the figure) processors 91, a memory 93, and a transmission apparatus 95.

The memory 93 may be configured to store a software program and module, for example, program instructions/modules corresponding to the method and apparatus for displaying an icon in the embodiments of the present disclosure. The processor 91 runs the software program and module stored in the memory 93, to implement various functional applications and data processing, that is, implement the method for displaying an icon. The memory 93 may include a high-speed random access memory, and may also include a nonvolatile memory, for example, one or more magnetic storage devices, flash memories or other nonvolatile solid-state memories. In some examples, the memory 93 may further include memories remotely disposed relative to the processor 91, and these remote memories may be connected to the computer terminal A through a network. Examples of the network include, but are not limited to, the Internet, an intranet, a local area network, a mobile communications network, or a combination thereof.

The foregoing transmission apparatus 95 is configured to receive or send data through a network. Specific examples of the foregoing network include a wired network and a wireless network. In an example, the transmission apparatus 95 includes an NIC, which may be connected to another network device and a router through a cable so as to perform communication with the Internet or a local area network. In an example, the transmission apparatus 95 is an RF module, which is configured to perform communication with the Internet in a wireless manner.

Specifically, the memory 93 is configured to store information about a user of a preset action condition and a preset permission, and an application program.

The processor 91 may invoke, by using the transmission apparatus, the information and the application program that are stored in the memory 93, to perform the following steps.

Optionally, the foregoing processor 91 may execute a program code for performing the following steps:

S1: Display a first icon and at least one display orbit on an interface, the first icon being a user icon of a user that currently logs in to an application program, and each of the at least one display orbit being a path that uses the first icon as a center and surrounds on a periphery of the first icon;

S2: Obtain a first application function activated in the application program;

S3: Obtain a first function icon of the first application function; and

S4: Display the first function icon of the first application function on a first display orbit, the first display orbit being one of the at least one display orbit.

Optionally, in this embodiment, the storage medium is further configured to store a program code for performing the following steps:

S1: Obtain a use frequency of the any application function after the at least one application function is obtained, and when multiple application functions are enabled, the step of displaying the function icon of any application function on a corresponding display orbit includes:

S2: Sort use frequencies of the application functions; and

S3: Respectively display function icons of the application functions on corresponding display orbits according to a sorting result of the use frequencies, where a function icon of an application function with a highest use frequency is displayed on a display orbit closest to the first icon.

Optionally, in this embodiment, the storage medium is further configured to store a program code for performing the following steps:

S1: Obtain time of latest use of the any application function after the at least one application function is obtained, and when multiple application functions are enabled, the step of displaying the function icon of any application function on a corresponding display orbit includes:

S2: Sort time of latest use of the application functions according to a time sequence; and S3: Respectively display function icons of the application functions on corresponding display orbits according to a sorting result of the time of latest use, where a function icon of an application function whose time of latest use is closest to current system time is displayed on a display orbit closest to the first icon.

Optionally, in this embodiment, the storage medium is further configured to store a program code for performing the following step:

S1: Adjust a display parameter of the function icon of any application function according to a distance between the first icon and each display orbit after the step of displaying the function icon of any application function on a corresponding display orbit, the display parameter including the following one or more parameters: a display luminance, a display chrominance, a display size, and a display profile; and a value of a display parameter of a function icon of an application function displayed on the display orbit closest to the first icon is maximum.

Optionally, in this embodiment, the storage medium is further configured to store a program code for performing the following step:

S1: Adjust a color of the display orbit to be the same as a color of the function icon of the application function displayed on the display orbit after the step of displaying the function icon of any application function on a corresponding display orbit.

Optionally, in this embodiment, the storage medium is further configured to store a program code for performing the following step:

S1: Control the function icon of any application function to move on the corresponding display orbit according to a preset direction after the step of displaying the function icon of any application function on a corresponding display orbit.

Optionally, in this embodiment, the storage medium is further configured to store a program code for performing the following steps:

S1: Receive a first touch signal after the step of displaying the function icon of any application function on a corresponding display orbit, where the first touch signal is a signal generated by touching the function icon of the application function; and S2: Switch the interface to a function page corresponding to the application function according to the first touch signal.

Optionally, in this embodiment, the storage medium is further configured to store a program code for performing the following steps:

S1: Receive a second touch signal after the step of displaying the function icon of any application function on a corresponding display orbit, where the second touch signal is a signal that shares the interface to a target object;

S2: Obtain a screenshot of the interface; and

S3: Send the screenshot of the interface to the target object according to the second touch signal.

Optionally, refer to examples described in the foregoing Embodiment 1 and Embodiment 2 for specific examples in this embodiment, and details are not described herein again.

The sequence numbers of the foregoing embodiments of the present disclosure are merely for the convenience of description, and do not imply the preference among the embodiments.

When integrated units in the foregoing embodiments are implemented in a form of a software functional module and sold or used as an independent product, the units may be stored in a computer-readable storage medium. Based on such an understanding, the technical solutions of the present disclosure essentially, or the part contributing to the related technologies, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure.

In the foregoing embodiments of the present disclosure, each embodiment is described with a focus. Refer to related descriptions of other embodiments for a part that is not described in detail in an embodiment.

In the several embodiments provided in the present application, it should be understood that the disclosed client may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

The foregoing embodiments only show preferable implementations of the present disclosure. It should be noted that a person of ordinary skill in the art may further make improvements and modifications without departing from the principle of the present disclosure, which shall fall within the protection scope of the present disclosure.

In the embodiments of the present disclosure, in the manner of displaying a first icon and at least one display orbit on an interface, the first icon being a user icon of a user that currently logs in to an application program, and the display orbit being a path that uses the first icon as a center and surrounds on a periphery of the first icon; obtaining at least one application function enabled in the application program; obtaining a function icon of any application function; and displaying the function icon of any application function on a corresponding display orbit, the user icon and the display orbit are displayed on the interface, and a function icon of the application function enabled in the application program is displayed on a corresponding display orbit, so as to intuitively and vividly display, in a graphical presentation manner, the user icon of the user that logs in to the application program and related function icons thereof, thereby intuitively displaying a relationship between the user icon of the user that logs in to the application program and the related function icons thereof, enhancing the display effect of the interface, and improving use experience of the user, so as to resolve the technical problem of a poor display effect in the related technologies because the user icon of the user that currently logs in to the application program and the related function icons thereof are displayed in a list manner.

What is claimed is:

1. A method for displaying an icon, comprising:
    displaying a user icon on an interface corresponding to an application program, the user icon including an image of a user portrait or a user signature of a user that currently logs in to the application program;
    displaying on the interface first and second display orbits surrounding a periphery of the user icon, wherein:
        the user icon flickers according to a preset time; or
        the user icon jumps with a magnitude at a position; or
        a movable dot rotates around the user icon along the first display orbit or the second display orbit;
    selecting first and second gaming application functions activated in the application program;
    obtaining first and second function icons respectively representing the first and second gaming application functions according to a correspondence between gaming application functions and function icons pre-stored in the application program;
    positioning the first function icon representing the first gaming application function on the first display orbit and positioning the second function icon representing the second gaming application function on the second display orbit;
    after the user logs into the application program, activating a third gaming application function carried in the application program, wherein the third gaming application function is activated from a previously inactivated state;
    displaying on the interface a third function icon representing the third gaming application function in response to the third gaming application function being activated, wherein the third function icon was not previously displayed on the interface prior to activation of the third gaming application function; and
    placing the third function icon on a third display orbit on the interface for display, wherein one function icon is displayed on each of the first display orbit, the second display orbit and the third display orbit, and wherein the first display orbit, the second display orbit and the third display orbit are concentric loops with a distance between any two of the first display orbit, the second display orbit, and the third display orbit on the interface.

2. The method according to claim 1, further comprising:
    obtaining first and second use frequencies respectively of the first and second gaming application functions;
    sorting the first and second use frequencies, the first use frequency being higher than the second use frequency after sorting;
    making the first function icon larger in size than the second function icon; and
    positioning the first display orbit between the user icon and the second display orbit.

3. The method according to claim 1, further comprising:
    obtaining first and second time stamps respectively of latest use of the first and second gaming application functions;
    sorting the first and second time stamps of latest use, the first time stamp being more recent than the second time stamp after sorting;
    making the first function icon larger in size than the second function icon; and
    positioning the first display orbit between the user icon and the second display orbit.

4. The method according to claim 1, wherein the first and second function icons have a graphical appearance that varies respectively with first and second values of a display parameter, the display parameter including at least one of a display luminance or a display chrominance, and the first value of the display parameter being greater than the second value of the display parameter, the method further comprising:
    positioning the first display orbit between the user icon and the second display orbit.

5. The method according to claim 1, further comprising:
    receiving a touch signal corresponding to sharing the interface to a target object, the target object including a friend of the user;
    obtaining a screenshot of the interface; and
    sending the screenshot of the interface to the target object according to the touch signal.

6. The method according to claim 5, further comprising:
    adding a supplemental description to the screenshot; and
    sending the screenshot of the interface with the supplemental description to the target object according to the touch signal.

7. The method according to claim 1, further comprising:
    changing an orbit parameter of the first display orbit and an icon parameter of the first function icon displayed on the first display orbit in real time, wherein the orbit parameter includes at least one of: an orbit line color, an orbit line thickness, or a distance to a neighboring orbit or the first function icon, and the icon parameter includes at least one of: an icon color, an icon size, or an icon shape.

8. The method according to claim 1, further comprising:
    deleting at least one of the first application function, the second application function, or the third application function from the application program.

9. The method according to claim 1, further comprising:
adding a fourth application function not carried in the application program into the application program.

10. The method according to claim 1, further comprising:
receiving a touch signal generated by touching the third function icon of the application program; and
switching the interface to a function page corresponding to the third function icon.

11. An apparatus for displaying an icon, comprising: a memory; a processor coupled to the memory, the processor being configured for:
displaying a user icon on an interface corresponding to an application program, the user icon including an image of a user portrait or a user signature of a user that currently logs in to the application program;
displaying on the interface first and second display orbits surrounding a periphery of the user icon, wherein:
the user icon flickers according to a preset time; or
the user icon jumps with a magnitude at a position; or
a movable dot rotates around the user icon along the first display orbit or the second display orbit;
selecting first and second gaming application functions activated in the application program;
obtaining first and second function icons respectively representing the first and second gaming application functions according to a correspondence between gaming application functions and function icons pre-stored in the application program;
positioning the first function icon representing the first gaming application function on the first display orbit and positioning the second function icon representing the second gaming application function on the second display orbit;
after the user logs into the application program, activating a third gaming application function carried in the application program, wherein the third gaming application function is activated from a previously inactivated state;
displaying on the interface a third function icon representing the third gaming application function in response to the third gaming application function being activated, wherein the third function icon was not previously displayed on the interface prior to activation of the third gaming application function; and
placing the third function icon on a third display orbit on the interface for display, wherein one function icon is displayed on each of the first display orbit, the second display orbit and the third display orbit, and wherein the first display orbit, the second display orbit and the third display orbit are concentric loops with a distance between any two of the first display orbit, the second display orbit, and the third display orbit on the interface.

12. The apparatus according to claim 11, wherein the processor is further configured for:
obtaining first and second use frequencies respectively of the first and second gaming application functions;
sorting the first and second use frequencies, the first use frequency being higher than the second use frequency after sorting;
making the first function icon larger in size than the second function icon; and
positioning the first display orbit between the user icon and the second display orbit.

13. The apparatus according to claim 11, wherein the processor is further configured for:
obtaining first and second time stamps respectively of latest use of the first and second gaming application functions;
sorting the first and second time stamps of latest use, the first time stamp being more recent than the second time stamp after sorting;
making the first function icon larger in size than the second function icon; and
positioning the first display orbit between the user icon and the second display orbit.

14. The apparatus according to claim 11, wherein the first and second function icons have a graphical appearance that varies respectively with first and second values of a display parameter, the display parameter including at least one of a display luminance or a display chrominance, and the first value of the display parameter being greater than the second value of the display parameter, wherein the processor is further configured for:
positioning the first display orbit between the user icon and the second display orbit.

15. The apparatus according to claim 11, wherein the processor is further configured for:
receiving a touch signal corresponding to sharing the interface to a target object, the target object including a friend of the user;
obtaining a screenshot of the interface; and
sending the screenshot of the interface to the target object according to the touch signal.

16. A non-transitory storage medium, the storage medium being configured to store computer-executable program code for, when being executed by a processor, implementing a method for displaying an icon, the method comprising:
displaying a user icon on an interface corresponding to an application program, the user icon including an image of a user portrait or a user signature of a user that currently logs in to the application program;
displaying on the interface first and second display orbits surrounding a periphery of the user icon, wherein:
the user icon flickers according to a preset time; or
the user icon jumps with a magnitude at a position; or
a movable dot rotates around the user icon along the first display orbit or the second display orbit;
selecting first and second gaming application functions activated in the application program;
obtaining first and second function icons respectively representing the first and second gaming application functions according to a correspondence between gaming application functions and function icons pre-stored in the application program;
positioning the first function icon representing the first gaming application function on the first display orbit and positioning the second function icon representing the second gaming application function on the second display orbit;
after the user logs into the application program, activating a third gaming application function carried in the application program, wherein the third gaming application function is activated from a previously inactivated state;
displaying on the interface a third function icon representing the third gaming application function in response to the third gaming application function being activated, wherein the third function icon was not previously displayed on the interface prior to activation of the third gaming application function; and
placing the third function icon on a third display orbit on the interface for display, wherein one function icon is displayed on each of the first display orbit, the second display orbit and the third display orbit, and wherein the first display orbit, the second display orbit and the third display orbit are concentric loops with a distance between any two of the first display orbit, the second display orbit, and the third display orbit on the interface.

17. The non-transitory storage medium according to claim 16, wherein the storage medium is further configured to store a program code for performing:
   obtaining first and second use frequencies respectively of the first and second gaming application functions;
   sorting the first and second use frequencies, the first use frequency being higher than the second use frequency after sorting;
   making the first function icon larger in size than the second function icon; and
   positioning the first display orbit between the user icon and the second display orbit.

* * * * *